United States Patent
Higham et al.

(10) Patent No.: US 6,381,520 B1
(45) Date of Patent: Apr. 30, 2002

(54) SUN SEEKING SOLAR ARRAY CONTROL SYSTEM AND METHOD

(75) Inventors: John S. Higham, Mountain View; Lee Rotlisberger, Fremont, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/613,410

(22) Filed: Jul. 10, 2000

(51) Int. Cl.⁷ ................................................. G06F 7/00
(52) U.S. Cl. ............................. 701/13; 701/3; 701/226; 244/158 R
(58) Field of Search .................... 701/13, 3, 4, 226; 244/158 R, 167, 168, 173

(56) References Cited

U.S. PATENT DOCUMENTS

| | | | | |
|---|---|---|---|---|
| 4,747,567 A | * | 5/1988 | Johnson et al. | 244/173 |
| 5,394,075 A | * | 2/1995 | Ahrens et al. | 320/39 |
| 5,669,586 A | * | 9/1997 | Tadros | 244/167 |
| 5,895,014 A | * | 4/1999 | Sullivan | 244/168 |
| 5,996,942 A | * | 12/1999 | Price et al. | 244/168 |
| 6,021,979 A | * | 2/2000 | Bender et al. | 244/164 |
| 6,068,218 A | * | 5/2000 | Cosner et al. | 244/173 |
| 6,102,339 A | * | 8/2000 | Wu et al. | 244/173 |
| 6,186,446 B1 | * | 2/2001 | Tiley et al. | 244/158 R |
| 6,227,497 B1 | * | 5/2001 | Draim | 244/173 |

* cited by examiner

*Primary Examiner*—Jacques H. Louis-Jacques
(74) *Attorney, Agent, or Firm*—Kenneth W. Float

(57) ABSTRACT

A control system and method that keeps solar arrays on a satellite pointing toward the sun. Exemplary control systems and methods are implemented as follows. An orbit propagator computes satellite orbital location data and computes a sun vector referenced to an inertial reference frame. A coordinate transformation processor processes the sun vector in the inertial reference frame and a sensed satellite attitude signal to generate a sun vector referenced to a satellite body reference frame. A solar array position processor processes a step count derived from a solar array pointing control system and sensed solar array position to generate an estimate of the position of the solar array. A summing device sums the solar array position estimate output, the body frame gun vector, and a bias signal derived from a ground command, to produce a solar array position error signal. A filter filters the solar array position error signal. A current regulator processor processes a measured solar array current to produce another solar array position error signal based on current output. An eclipse processor processes the satellite orbital location data, the solar array position error output signal, and the low pass filtered solar array position error signal to generate a step command. The solar array pointing control system processes the step command to generate control signals that point the solar array at the sun.

10 Claims, 2 Drawing Sheets

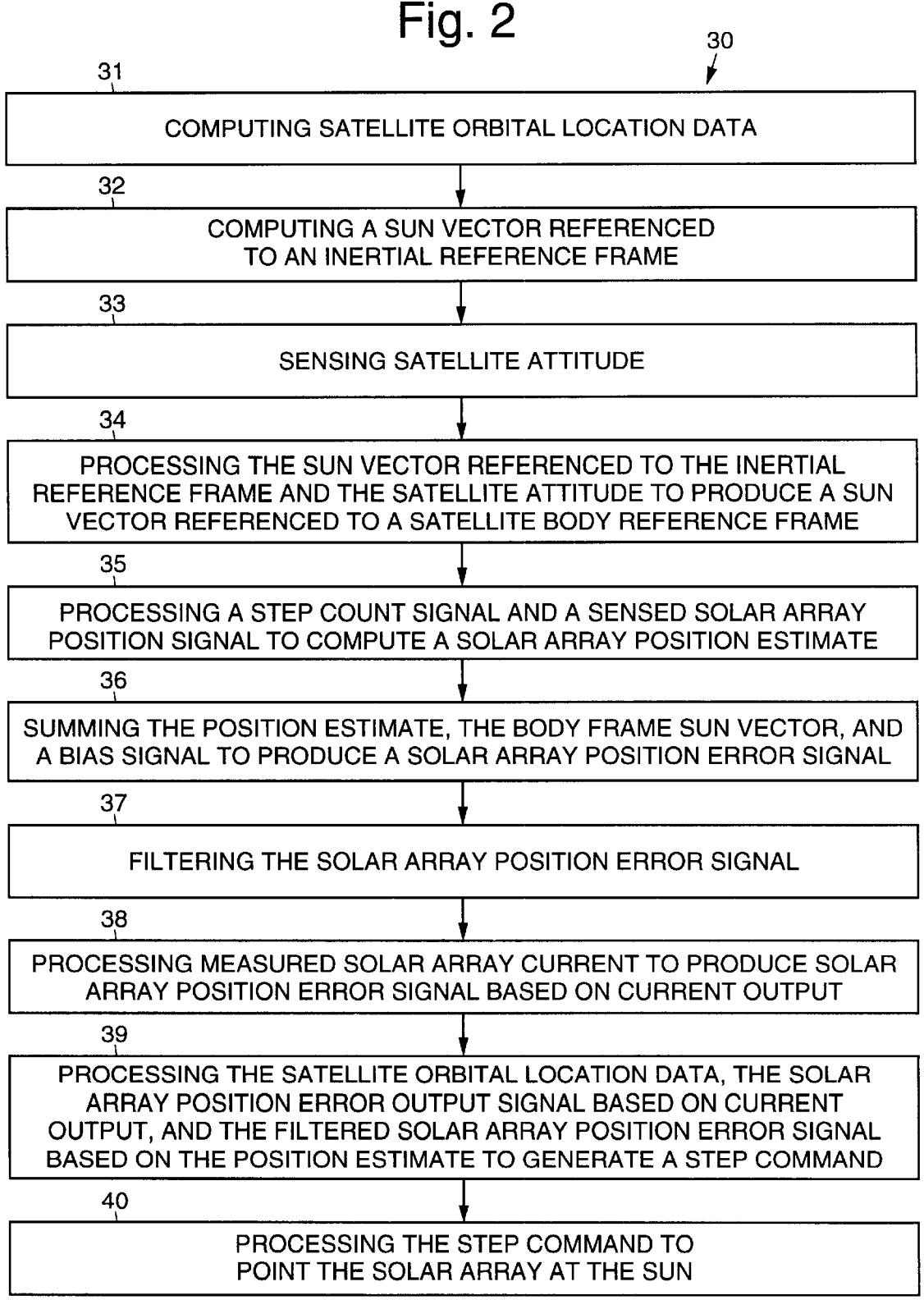

SUN SEEKING SOLAR ARRAY CONTROL SYSTEM AND METHOD

BACKGROUND

The present invention relates generally to solar arrays employed on satellites, and more particularly, to control systems and methods that controls the solar arrays so that they point at the sun.

State of the art relating to pointing of solar arrays falls into two categories. In a first category, the satellite attitude is generally Earth fixed and the orbit is near circular. In this case, the solar array pointing can be synchronized to a simple clock. In a second category, the satellite attitude is not Earth fixed, or the orbit is elliptical. In this case, the array pointing is performed using knowledge of the satellite orbit and attitude with respect to the sun.

Concentrator-type solar arrays that require tight pointing with respect to the sun have special requirements. A satellite that requires self-detecting fault detection, isolation and recovery (FDIR) also has special requirements. The present invention addresses the problem of synchronization to a simple clock, as posed by the application of a concentrator-type solar array, as well as the problem of recovery after a fault detection for the application of a solar array that is pointed using knowledge of the satellite orbit and attitude.

It is believed that conventional control schemes have described in the literature that use power (not current) as a control input. The inventors are also unaware of conventional control schemes that use both current and position estimates and use weighting/logic to determine when to step the array based on factors such as fault detection and eclipse periods, and the like.

Accordingly, it would be advantageous to have improved control systems and methods that control solar arrays disposed on a satellite so that they point at the sun.

SUMMARY OF THE INVENTION

The present invention provides for a control system and method that keeps solar arrays pointing toward the sun. The present invention is especially useful with concentrator-type solar arrays and/or periods of loss of fine pointing control of the satellite bus.

An exemplary control system comprises an orbit propagator that computes and outputs real-time satellite orbital location data and a sun vector referenced to an inertial reference frame. A coordinate transformation processor processes the sun vector in the inertial reference frame and the satellite attitude to generate a sun vector referenced to a satellite body reference frame. A solar array position processor processes the requested solar array step count taken from a solar array pointing control system and the sensed solar array position derived from a solar array position sensor to generate an estimate of the solar array position.

A summing device processes the solar array position estimate from the solar array position processor, the body frame sun vector, and a bias signal (which generally is zero) from ground command, to produce a solar array position error signal. A filter filters the solar array position error signal output by the summing device such that the output signal has most noise sources removed.

A current regulator (K/τS) processor processes the measured solar array current signal to estimate a solar array position error signal. The current regulator has a sufficiently long time constant (τ) such that the output signal has most noise sources removed. An eclipse processor uses the satellite orbital location output by the orbit propagator, the estimated solar array position error output signal derived from the current regulator processor, and the low pass filtered solar array position error output signal to generate a step command ($\delta_{STEP}$) The eclipse processor uses logic to determine which solar array position error is more heavily weighted. This weighting can change per ground command, or autonomously during periods when the satellite is in an eclipse period, which would render the solar array position error from the current regulator meaningless. The weighting can also change during periods that a fault detection declares that orbit or attitude data are unreliable, which would render the solar array position error from the position estimate meaningless. The solar array pointing control system processes the step command to generate control signals that point the solar array at the sun.

An exemplary control method comprises the following steps. Orbit location is computed. A sun vector referenced to an inertial reference frame is determined. Satellite attitude is sensed. The sun vector referenced to the inertial reference frame and the satellite attitude are processed to produce a sun vector referenced to a satellite body reference frame. The requested solar array step count taken from a solar array pointing control system and the sensed solar array position from a solar array position sensor are processed to compute a solar array position estimate.

The solar array position estimate, the body frame sun vector, and a bias signal from ground command, are summed to produce a solar array position error signal based on an estimate of the position. The solar array position error signal filtered. The solar array current is sensed and processed by the current regulator to produce another solar array position error signal, but based on the current output and not a position estimate.

The satellite orbital location, the solar array position error signal based on current output, and the solar array position error signal based on the position estimate are processed to generate a step command. The step command is processed by the solar array pointing control system to point the solar array at the sun.

When used with a concentrator-type solar array, the present invention does not require adjustment to the clock or to the position of the array, as is required if simple clock synchronization is utilized. The present invention also does not require knowledge of the satellite attitude or orbit during recovery from fault detection when used with any type of solar array.

BRIEF DESCRIPTION OF THE DRAWINGS

The various features and advantages of the present invention may be more readily understood with reference to the following detailed description taken in conjunction with the accompanying drawings wherein like reference numerals designate like structural elements, and in which:

FIG. 2 is a flow diagram that illustrates an exemplary solar array pointing control method in accordance with the principles of the present invention.

DETAILED DESCRIPTION

Figure 1:
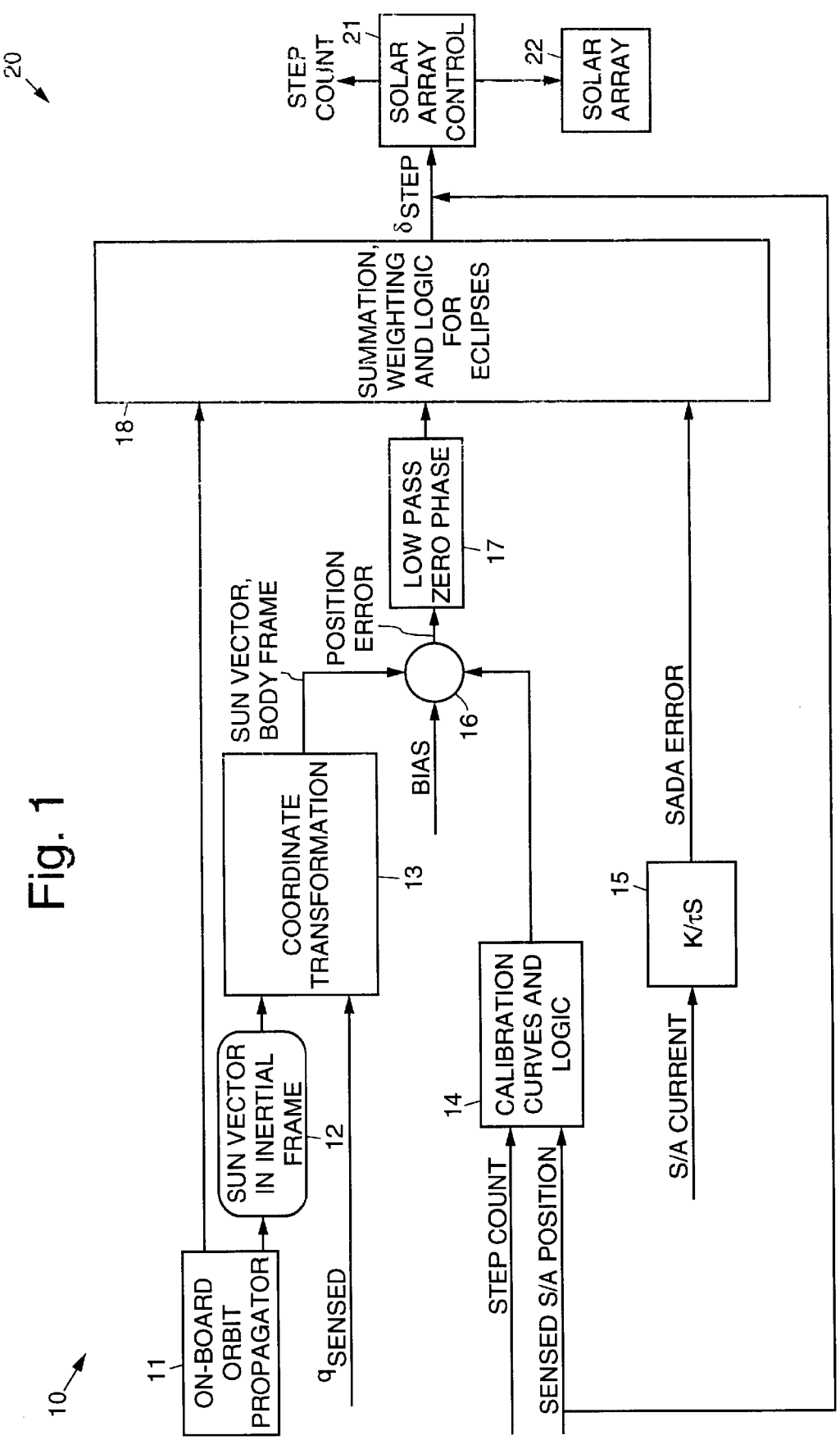
FIG. 1 is a block diagram that illustrates an exemplary control system in accordance with the principles of the present invention that controls a solar array to point at the sun.

Referring to the drawing figures, FIG. 1 is a block diagram that illustrates an exemplary control system 10 in accordance with the principles of the present invention that controls a solar array 22 disposed on a satellite 20 so that it points at the sun. The control system 10 comprises an orbit propagator 11 disposed on-board the satellite 20. The orbit propagator 11 computes and outputs an orbital position of the satellite as well as the sun and Earth that is input to an eclipse processor 18. The eclipse processor 18 comprises summation, weighting and logic that determines which of the solar array position errors gets the greatest weighting, and under which circumstances; i.e. the solar array position error based on measured solar array current is not used during periods of eclipse and the solar array position error based on the position estimate is not used during periods when orbit data is unavailable.

The orbit propagator 11 also outputs a sun vector 12 referenced to an inertial reference frame that is input to a coordinate transformation processor 13. A satellite attitude signal ($q_{SENSED}$) is sensed and is input to and processed along with the sun vector 12 in the inertial reference frame by the coordinate transformation processor 13 to produce a sun vector referenced to a satellite body reference frame.

A step count taken from a solar array pointing control system 21 along with the output of a position sensor (sensed solar array position) are input to a solar array position processor 14 that comprises calibration curves and logic that computes and outputs a solar array position estimate. The solar array position estimate output by the solar array position processor 14, the body frame sun vector output by the coordinate transformation 13, and a bias signal from ground command, are summed in a summing device 16 to produce a solar array position error signal. The solar array position error signal output by the summing device 16 is filtered by a low pass, zero phase filter 17, for example, and is input to the eclipse processor 18.

A measured solar array current is processed by a current regulator ($K/\tau S$) processor 15 to produce an estimated solar array position error signal. The solar array position error signal output by the processor 15 is input to the eclipse processor 18.

The eclipse processor 18 processes the satellite orbital location output by the orbit propagator 11, the solar array position error output signal derived from the current regulator processor 15, and the low pass filtered solar array position error output signal to generate a step command ($\delta_{STEP}$) that is input to the solar array pointing control system 21 to point the solar array 22 at the sun.

FIG. 2 illustrates an exemplary pointing control method 30 in accordance with the principles of the present invention for controlling pointing of a solar array 22 of a satellite 20. The method 30 comprises the following steps.

A satellite orbital location is computed 31. A sun vector 12 referenced to an inertial reference frame computed 32. A satellite attitude signal is sensed 33. The sun vector 12 referenced to the inertial reference frame and the satellite attitude signal are processed 34 to produce a sun vector referenced to a satellite body reference frame. A step count taken from a solar array pointing control system 21 and a sensed solar array position output of a solar array position sensor are processed 35 using calibration curves and logic to compute a solar array position estimate.

The position estimate from the solar array position processor, the body frame sun vector, and a bias signal derived from a ground command are summed 36 to produce a solar array position error signal. The solar array position error signal filtered 37. A measured solar array current is processed 38 to produce a solar array position error signal. The satellite orbital location data, the solar array position error output signal, and the low pass filtered solar array position error output signal are processed 39 to generate a step command. The step command is processed 40 by the solar array pointing control system 21 to point the solar array 22 at the sun.

Thus, an improved control system and method that controls solar arrays disposed on a satellite so that they point at the sun have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A control system disposed on a satellite for controlling pointing of a solar array, comprising:

an orbit propagator that computes and outputs satellite orbital location data and a sun vector referenced to an inertial reference frame;

a coordinate transformation processor for processing the sun vector in the inertial reference frame and a satellite attitude signal to generate a sun vector referenced to a satellite body reference frame;

a solar array position processor that for processing a step count and a sensed solar array position output of a solar array position sensor to generate an estimate of the solar array position;

a summing device for processing the position estimate from the solar array position processor, the body frame sun vector, and a bias signal, to produce a solar array position error signal;

a filter for filtering the solar array position error signal output by the summing device;

a current regulator processor for processing a measured solar array current to produce a solar array position error signal;

an eclipse processor for processing the satellite orbital location data output by the orbit propagator, the solar array position error output signal derived from the current regulator processor, and the filtered solar array position error output signal to generate a step command; and wherein the solar array pointing control system processes the step command to generate control signals that point the solar array at the sun.

2. The system recited in claim 1 wherein the filter comprises a low pass, zero phase filter.

3. The system recited in claim 2 wherein the eclipse processor comprises summation, weighting and logic circuitry.

4. The system recited in claim 2 wherein the solar array position processor comprises calibration curves and logic for processing the step count and the sensed solar array position output of a solar array position sensor to generate the estimate of the solar array position.

5. The system recited in claim 2 wherein the bias signal is derived from a ground command.

6. A method for controlling the pointing of a solar array disposed on a satellite, comprising the steps of:

computing satellite orbital location data;

computing a sun vector referenced to an inertial reference frame of the satellite;

sensing satellite attitude;

processing the sun vector referenced to the inertial reference frame and the satellite attitude to produce a sun vector referenced to a satellite body reference frame;

processing a step count signal and a sensed solar array position signal to compute a solar array position estimate;

summing the position estimate, the body frame sun vector, and a bias signal to produce a solar array position error signal;

filtering the solar array position error signal;

processing measured solar array current to produce solar array position error signal based on current output;

processing the satellite orbital location data, the solar array position error output signal based on current output, and the filtered solar array position error signal based on the position estimate to generate a step command; and processing the step command to point the solar array at the sun.

7. The method recited in claim 6 wherein the step of filtering the solar array position error signal comprises the step of low pass, zero phase filtering the solar array position error signal.

8. The method recited in claim 6 wherein the processing step comprises the steps of summing, weighting and logically combining the signals to generate the step command.

9. The method recited in claim 6 wherein the step of processing a step count signal comprises the step of processing a step count signal and a sensed solar array position signal using calibration curves and logic to compute a solar array position estimate.

10. The method recited in claim 6 wherein the bias signal is derived from a ground command.

\* \* \* \* \*